United States Patent
Drane et al.

(10) Patent No.: US 7,946,540 B2
(45) Date of Patent: May 24, 2011

(54) COUPLING/SPLICE/END BRACKET FOR CHANNEL

(75) Inventors: Mark R. Drane, Germantown, TN (US); Robert K. Jolly, Cordova, TN (US); Omid Karimnia, Memphis, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 406 days.

(21) Appl. No.: 12/150,131

(22) Filed: Apr. 25, 2008

(65) Prior Publication Data

US 2009/0266962 A1     Oct. 29, 2009

(51) Int. Cl.
*F16L 3/08* (2006.01)
*F16L 3/00* (2006.01)

(52) U.S. Cl. ............... 248/65; 248/59; 248/73; 411/433

(58) Field of Classification Search ............ 248/49, 248/57–59, 65, 73, 74.1, 218.4, 220.21, 220.22, 248/227.3; 411/151, 432–433, 540, 362
See application file for complete search history.

(56) References Cited

U.S. PATENT DOCUMENTS

| | | | | |
|---|---|---|---|---|
| 2,375,513 A | * | 5/1945 | Bach ................................ 248/59 |
| 3,606,418 A | | 9/1971 | Buker et al. |
| 4,036,546 A | * | 7/1977 | Thompson et al. ........... 439/435 |
| 4,733,986 A | | 3/1988 | Kenning et al. ............... 403/306 |
| 4,901,958 A | * | 2/1990 | Kelso ............................... 248/59 |
| 4,993,095 A | | 2/1991 | Lautensleger et al. ............ 14/17 |
| 5,102,074 A | * | 4/1992 | Okada ............................. 248/59 |
| 5,372,341 A | * | 12/1994 | Witherbee et al. .............. 248/49 |
| 5,564,658 A | | 10/1996 | Rinderer ......................... 248/58 |
| 5,816,542 A | | 10/1998 | Rinderer ......................... 248/58 |
| 5,868,361 A | | 2/1999 | Rinderer ......................... 248/58 |
| 6,260,810 B1 | * | 7/2001 | Choi ............................... 248/65 |
| 6,313,405 B1 | | 11/2001 | Rinderer ....................... 174/68.3 |
| 6,354,542 B1 | * | 3/2002 | Meyer et al. .................... 248/58 |
| 6,412,733 B1 | * | 7/2002 | Grzemski ........................ 248/49 |
| 6,494,415 B1 | * | 12/2002 | Roth ............................. 248/74.1 |
| 6,621,847 B1 | * | 9/2003 | Tada ............................... 372/57 |
| 6,631,874 B2 | | 10/2003 | Turpin et al. .................... 248/49 |
| D557,594 S | | 12/2007 | Whipple ....................... D8/373 |
| 7,645,492 B2 | * | 1/2010 | Gasworth ..................... 427/446 |
| 7,661,915 B2 | * | 2/2010 | Whipple ....................... 411/151 |
| 2008/0080956 A1 | | 4/2008 | Whipple ....................... 411/433 |
| 2009/0266962 A1 | * | 10/2009 | Drane et al. .................. 248/314 |

* cited by examiner

*Primary Examiner* — Tan Le
(74) *Attorney, Agent, or Firm* — Hoffman & Baron, LLP

(57) ABSTRACT

A coupling bracket having a back wall, first and second side walls extending from the back wall to a pair of edges, an open side opposite the back wall, a pair of opposing open ends and a passage extending between the opposing open ends. Each side wall has an open slot extending from the edge to a closed end or base. The bases of the open slots are correspondingly located and aligned and adapted to receive a rod extending through and substantially perpendicular to the side walls. The passage is adapted to receive an elongate rail.

15 Claims, 10 Drawing Sheets

COUPLING/SPLICE/END BRACKET FOR CHANNEL

FIELD OF THE INVENTION

The present invention relates to coupling brackets used in structures that support electrical wires and cables. In particular, the present invention relates to coupling brackets that are used in modular support structure assemblies, which can be easily installed in existing facilities.

BACKGROUND OF INVENTION

Support structure assemblies, such as cable tray assemblies, are well known for use as a support system for electrical cables, wires, tubing, piping or other conduits in buildings and other commercial and industrial facilities. Support structure assemblies provide support when significant distances have to be spanned and are typically suspended from the ceiling or walls. Support structure assemblies can be used to hold up and distribute cables in the same manner that roadway bridges support traffic. These support structures are an assembly of structural sections and fittings that form a rigid structural system for fastening and/or supporting cables. Such support structure assemblies are the structural component of a building's electrical system.

In many applications, support structure assemblies have to support several hundred pounds of cables and, therefore, must be sturdily constructed. Typically, these support structure assemblies are made of steel and the vertical supports are permanently anchored in the walls or ceiling of a facility. However, this has been found to cause problems when additional cables need to be run and the capacity of the existing support structure assemblies is completely utilized. In a crowded facility, it may be necessary to temporarily disassemble an existing support structure assembly in order to install additional support structure assemblies. This can cause disruptions in operations and can be time consuming and expensive.

The structural support systems currently used require each channel between threaded support rods to be measured and cut to fit in order to install a new support structure in an existing support system. In addition, it is usually necessary to stagger the elevation of each adjacent channel during the installation so that adjoining channels can be attached to the same threaded rod. The coupling brackets that are currently used in structural support systems are designed to be used in new constructions and are not easily adapted to modifications of existing structural support systems. In most cases, existing coupling brackets require at least some disassembly of an existing structural support system before they can be installed.

Accordingly, there is a need for a coupling bracket that can be installed in an existing structural support system with a minimum amount of disassembly of existing support structures and disruption of operations. Moreover, there is a need for a coupling bracket that facilitates modular construction of a structural support system in confined spaces without an excessive amount of cutting and fitting of the components.

SUMMARY OF THE INVENTION

In accordance with the present invention, a coupling bracket for attaching elongate rails to rods is provided. The coupling bracket includes a back wall, first and second side walls extending from the back wall to a pair of edges, an open side opposite the back wall that is defined by the pair of edges, a pair of opposing open ends and a passage extending between the opposing open ends. Each side wall has an open slot extending from the edge towards the back wall. The closed ends or bases of the open slots are correspondingly located and aligned and adapted to receive a rod extending though and substantially perpendicular to the side walls. In addition, the passage is adapted to receive an elongate rail.

The coupling bracket can also have an end cap located at one of the open ends of the coupling bracket. The end cap prevents an elongate rail from being inserted into the coupling bracket passage. The end cap can include a member extending from the back wall and between the two side walls.

Each of the two side walls can have at least one mounting aperture and these apertures are correspondingly located and aligned. The back wall of the coupling bracket can also have at least one aperture. In addition, each of the two side walls can have an oblong aperture with a first end and a second end. The first end of the oblong aperture on the first side wall and the second end of the oblong aperture on the second side wall are correspondingly located and aligned to form a concentric opening through the side walls. In addition, the base of the open slot on the first side wall is formed by the second end of the oblong aperture and the base of the open slot on the second side wall is formed by the first end of the oblong aperture. In preferred embodiments, each of the open slots in the coupling bracket has a centerline, which extends inwardly from the edge of the side wall at an angle of from about 30 to about 150 degrees. Preferably, the angle for the centerline of one side wall is from about 30 to about 90 degrees and the angle for the centerline of the other side wall is from about 90 to about 150 degrees.

Another embodiment of the invention is a coupling bracket assembly for supporting cables, conduits and wires. The coupling bracket assembly includes one or more of the following: an elongate rail, a threaded rod, a coupling bracket and a securement device. The assembly can also include additional hardware, such as screws, bolts, nuts, clips and clamps. The elongate rail has an open channel extending along its length, a back wall and a pair of opposed sidewalls that define the open channel. The threaded rod is preferably made of steel and has a diameter of about ¼ to ¾-inch. However, the threaded rod can also be made of other materials and have a larger or smaller diameter. Moreover, unthreaded rods can be used, when provided with the proper securement devices to secure the coupling bracket to an unthreaded rod. The coupling bracket is described in detail above and can have two open ends or one open end and an end cap on the other end. The securement device can be a separable nut, a split nut, a clip or a clamp.

The threaded rod is inserted into the two open slots in the coupling bracket and the elongate rail is inserted into one of the opposing ends of the coupling bracket so that one of the side walls of the coupling bracket extends over the open channel. The securement device engages the threaded rod to secure the coupling bracket to the rod. In preferred embodiments, two securement devices are used to engage both the top and back of the coupling bracket. A fastening device can be inserted into the aperture in one of the side walls of the coupling bracket to secure the elongate rail in the coupling bracket. An end cap located at one of the open ends of the coupling bracket can be used to prevent an elongate rail from being inserted into one of the ends of the coupling bracket passage.

The invention also includes a kit of parts for a support structure assembly. The kit includes one or more coupling brackets and one or more securement devices, as described above. In addition, the kit can include elongate rails, threaded rods, bolts and nuts.

BRIEF DESCRIPTION OF THE FIGURES

The preferred embodiments of the coupling bracket of the present invention, as well as other objects, features and advantages of this invention, will be apparent from the accompanying drawings wherein.

DETAILED DESCRIPTION OF THE INVENTION

Figure 1:
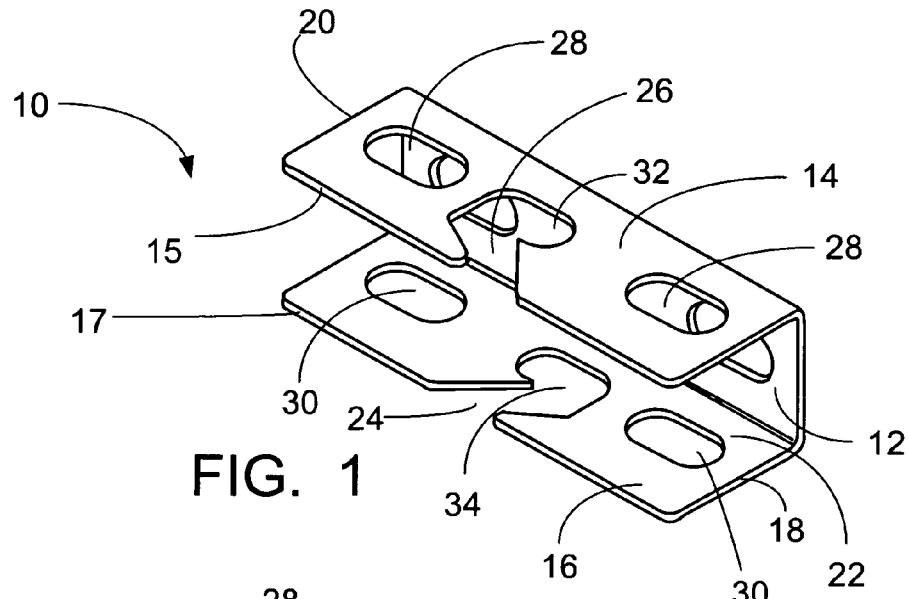
FIG. 1 is a perspective view of the front of a first embodiment of the coupling bracket.

The present invention is a coupling bracket that is used in the construction of structural support systems. The coupling bracket is used in a variety of different applications for connecting elongate rails (also referred to herein as "channel members" and "channels") and threaded rods to form a structural support system. The coupling bracket can be used to couple a channel end to a threaded rod, or it can be used to splice two elongate rails and, at the same time, support the elongate rails by connecting to a threaded rod. In one embodiment, the coupling bracket is installed on the end of an elongate rail and functions as an end cap. The coupling bracket is typically used in structural support systems formed by horizontal elongate rails that are supported by vertical threaded rods.

The coupling bracket has a back wall and a pair of side walls extending from the back wall to a pair of edges to define an open side (i.e., the cross-section is "U-shaped"). The back wall can have one or more apertures and each of the side walls has an open slot extending inwardly from the edge and at least one aperture. The open side and the opposing ends of the coupling bracket are adapted to slidably receive channel members and the open slots in the side walls are adapted to receive a threaded rod. The open side of the coupling bracket is designed to slide over a channel member from the side or for the channel member to be inserted into one of the ends. In either case, one of the side walls of the bracket is positioned over the opening in the channel member. In one embodiment, the open slots in the side walls of the coupling bracket are formed so that the bottoms of the two open slots are correspondingly located and aligned. This provides a concentric opening through the coupling bracket that is substantially perpendicular to the side walls. The configuration of the open slots and apertures in the coupling brackets are discussed in more detail below. The open slots in the side walls allow the coupling brackets to be installed on threaded rods from the side. In a typical installation, one or two horizontal channels abut a vertical threaded rod and the open slots in the coupling bracket receive the threaded rod while the side walls receive the channel. The coupling bracket is then secured to the threaded rod using securement devices and bolted to the channel member(s) to complete the installation. A variety of different types of securement devices can be used, such as nuts, clips and clamps.

In a preferred embodiment, each of the two side walls of the coupling bracket can include one or more apertures that are correspondingly located and aligned and a nonaligned oblong aperture. The oblong apertures are laterally offset from each other so that the first end of one oblong aperture is correspondently located and aligned with the second end of the other oblong aperture. The open slots in the side walls of the coupling bracket are in communication with the non-aligned ends of the respective oblong apertures. When the coupling bracket is attached to a threaded rod, the rod is positioned in the aligned ends of the oblong aperture so that the side walls of the coupling bracket are substantially perpendicular to the rod. The back wall of the coupling bracket can also have one or more apertures. Moreover, each of the open slots in the coupling bracket can have a centerline which extends from the edge of the side wall at an angle of from about 30 to about 150 degrees. Preferably, the angle for one side wall is from about 30 to about 90 degrees and the angle for the other side wall is from about 90 to about 150 degrees.

The coupling bracket can be secured to the threaded rod and channels with a securement device (such as a split nut or similar quick installation nut), which can be installed on the threaded rod at a pre-determined elevation. The securement device is installed on a threaded rod to provide initial support for the coupling bracket. The open slots on the two side walls of the coupling bracket fit over the threaded rod with one of the side walls of the coupling bracket resting on top of the nut so that the longitudinal axis of the coupling bracket is horizontally oriented and perpendicular to the threaded rod. A second securement device is then attached to the threaded rod above the coupling bracket to secure the bracket to the rod. A new section of channel can then be "rough-cut" without custom fitting because the coupling bracket is long enough so that it can receive different lengths of channel.

The securement device can be any nut, clip or clamp that that is capable of engaging the threads of the threaded rod and securing the bracket to the channel member. Preferably, the securement device is a "split nut" or similar device that can be attached to the threaded rod from the side and does not have to be threaded onto one of the ends of the rod. A preferred securement device for the present invention is disclosed in U.S. patent application Ser. No. 11/541,751, filed on Oct. 2, 2006, which is incorporated herein in its entirety.

The securement device can be a separable nut comprising two substantially planar members. Each planar member has a perimetrical edge, a central portion and an open slot. The open slot extends from the perimetrical edge to a curved base in the central portion and has a side wall with one or more threads at the curved base. The threaded rod is received by the open slots of the two planar members and engages the threads on the curved bases of the open slots after the planar members have been positioned in a registered relationship. Preferably, the two planar members are attached after the threaded rod is received in the open slots. The open slots in the planar members can be arcuate slots and the planar members can be pivotably attached so that they rotate in parallel planes. In preferred embodiments, the planar members pivot into an overlapping or registered relationship so that the two open slots receive the threaded rod from opposing sides.

The securement device can also be a split nut formed by two semi-annular members, each member having a curved outer surface with a plurality of flats and a curved inner surface with a plurality of threads. The threaded rod is received between the two semi-annular members and engages the plurality of threads. The two semi-annular members can then be attached together. The securement device can also be a clip that has a base and two parallel legs extending from the opposing ends of the base. The legs are adapted to engage the threads of the rod between them to secure the clip to the rod.

In general, the modular support structure assemblies formed using the coupling brackets include channel members, coupling brackets, threaded rods and a variety of nuts and bolts. The coupling brackets facilitate modular construction and allow the structural support systems to be easily installed in existing facilities. The coupling/splice brackets and coupling end brackets are attached to existing threaded rods so that additional channels can be installed above an existing channel framework without having to disassemble or remove the existing structure. One of the advantages of the coupling brackets is that they connect new channels between existing threaded rods at the same elevation so that the top surface of the support structure formed by the channels has a common plane.

The coupling brackets of the present invention engage both the threaded rods and channels and eliminate the need for custom fitting each channel precisely between two threaded support rods. This enables the user to cut the channel in approximate lengths and eliminates the need for cutting slots at the ends of the channels for receiving the rod. The coupling brackets can receive channels from both ends so that there is no need to stagger the channels at different elevations between adjacent support rods. The flexible design of the coupling brackets allows retrofit work on a structural support assembly in an existing facility to be completed with minimum disruption of operations. The structural support assembly can be easily and quickly installed above or below existing structural support systems without temporarily removing the existing structures located below or above the new structural support assembly. The completed installation is a continuous run of channel members at a uniform elevation attached to multiple support rods by a plurality of coupling brackets.

A support structure assembly is formed by positioning the two open slots in the side walls of a coupling bracket around a threaded rod. Securement devices are attached from the side of the rod above and below the coupling bracket to secure it to the threaded rod. Two channels are then inserted into the ends of the coupling bracket so that one of the side walls of the coupling bracket extends over the open channel. The channels are secured in place by fastening devices inserted into the apertures in the side walls of the coupling bracket on either side of the threaded rod. The fastening devices can be bolts (or screws) and nuts.

One embodiment of the coupling bracket is used as an end cap and is located at the ends of the support structure assembly. The end cap prevents an elongate rail from being inserted into the coupling bracket passage. Preferably, the coupling bracket end cap is formed by a member extending from the back wall and between the two side walls of the coupling bracket at one of the open ends. In another embodiment, the open slots in the side walls of the coupling bracket are located close to one of the ends so that the threaded rod prevents insertion of a channel member from that end.

The terms elongate rail, channel member, metal framing channel and channel as used herein refer to an elongate metal structure having a back wall with a pair of side walls extending from the longitudinal side edges to a pair of ledges to define a channel slot and a pair of opposing open ends. The ledges extend over the channel slot to define a channel opening. These channel members have a "U-shaped" cross-section and are commercially available under the trade names Kindorf® or SuperStrut®.

The rod used with the coupling bracket is typically a threaded steel rod having a diameter of about ¼ to ¾ inch. However, the invention is not limited by the diameter or the material of construction and the invention can be used with threaded or unthreaded rods of any diameter and constructed of any material. Moreover, the coupling bracket can be used with an unthreaded rod. When an unthreaded rod is used the brackets can be held in place using clamps or similar fastening devices that can be tightly secured to an unthreaded surface.

Figure 2:
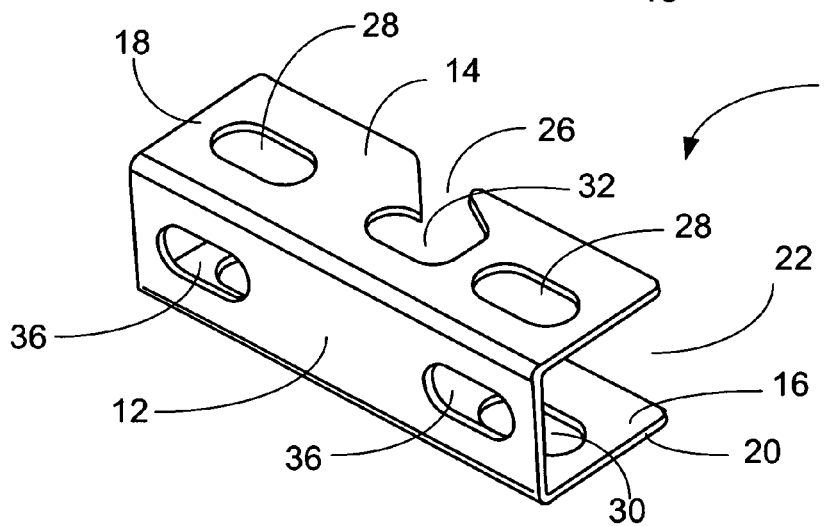
FIG. 2 is a perspective view of the back of the coupling bracket in FIG. 1.
Figure 3:
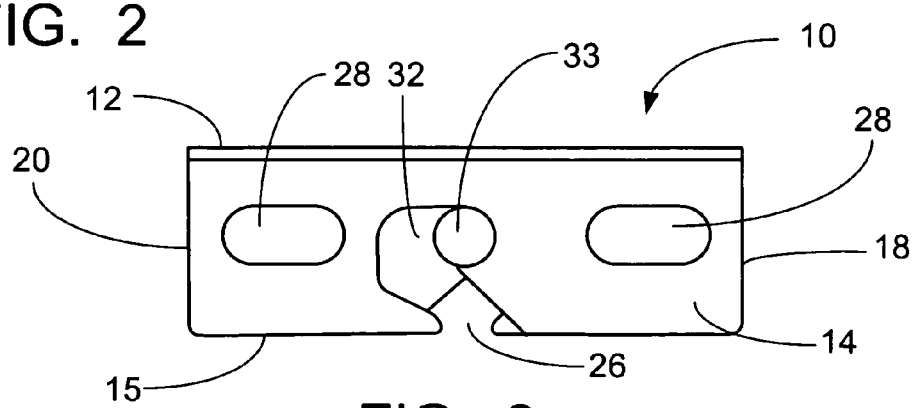
FIG. 3 is a top view of the coupling bracket in FIG. 1.
Figure 13:
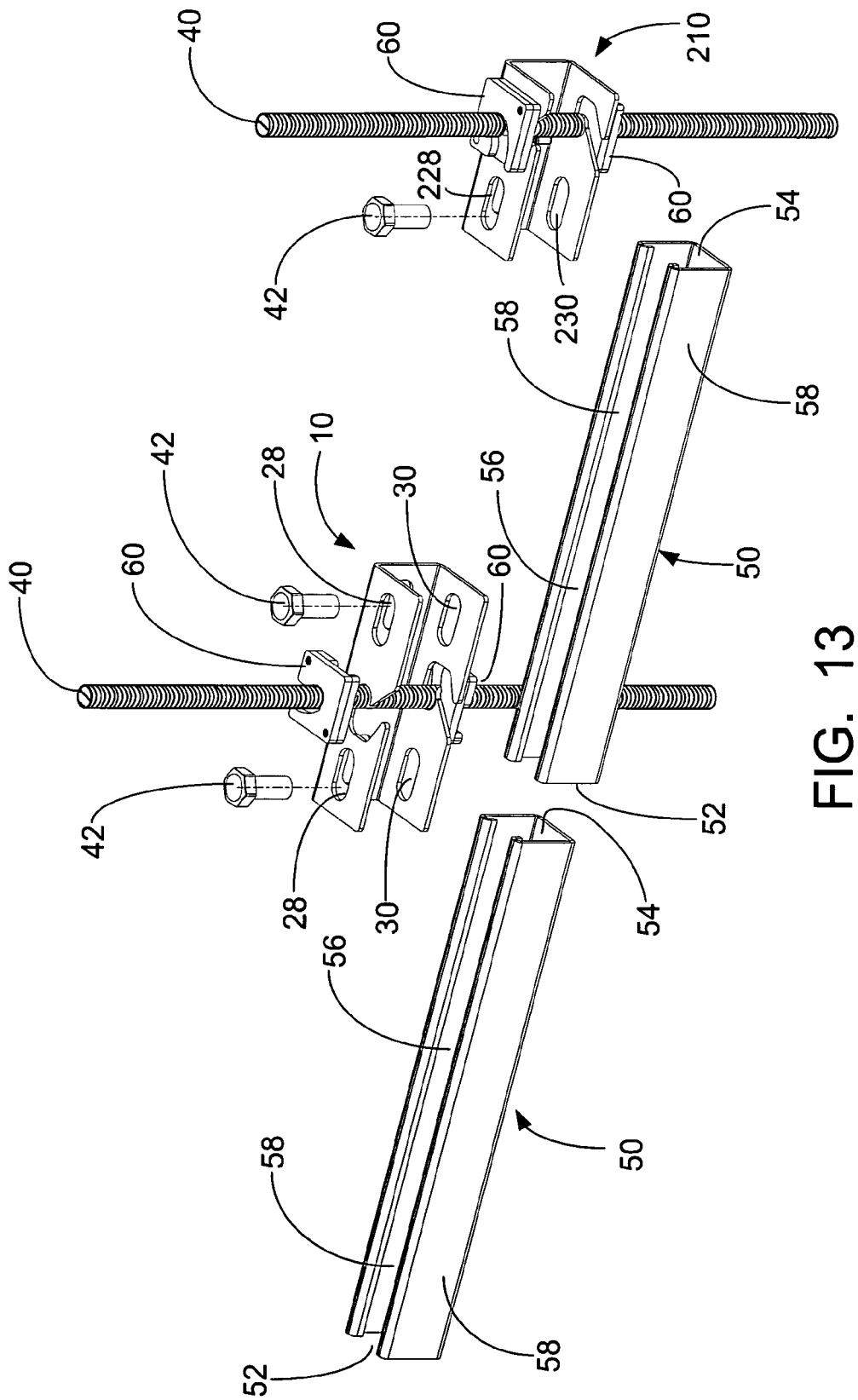
FIG. 13 is an exploded view of the support structure assembly of the present invention with the first and third embodiments of the coupling bracket attached to threaded rods.

Referring now to the drawings, FIGS. 1-3 show a first embodiment of the coupling bracket 10 with a pair of side walls 14, 16 extending from a back wall 12 to a pair of edges 15, 17 that define a passage 22. Each side wall 14, 16 has a centrally located open slot 24, 26 extending angularly from the edge 15, 17 towards the back wall 12. Each of the closed ends or bases of the open slots 24, 26 is in communication with an oblong aperture 32, 34. The oblong apertures 32, 34 are laterally offset from one another so that the first end of one aperture 32 is correspondingly located and aligned with the second end of the other aperture 34. This provides a concentric opening 33 through the aligned opposing ends (FIG. 3) of the oblong apertures 32, 34. A line drawn through the concentric opening 33 would be substantially perpendicular to the side walls 14, 16. The open slots 24, 26 in the side walls 14, 16 extend to the non-aligned end of the oblong apertures 32, 34. In addition, the side walls 14, 16 each have a pair of mounting apertures 28, 30 for attaching the coupling bracket 10 to a channel 50 (FIG. 13). These apertures 28, 30 are correspondingly located and aligned. The passage 22 extends between the opposing ends 18, 20 and is bounded by the back wall 12 and the side walls 14, 16. The back wall 12 also has a pair of apertures 36.

Figure 4:
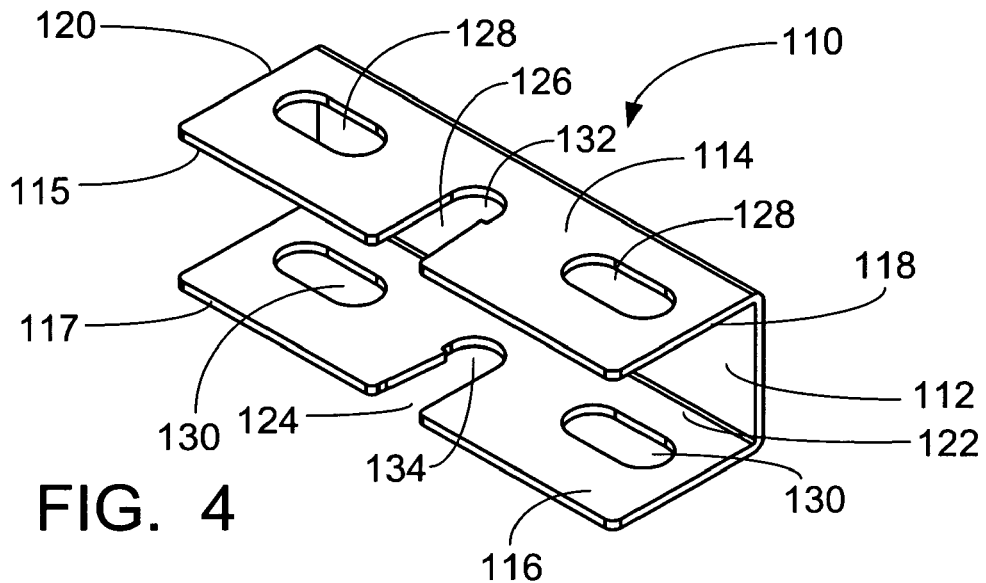
FIG. 4 is a perspective view of the front of a second embodiment of the coupling bracket.
Figure 5:
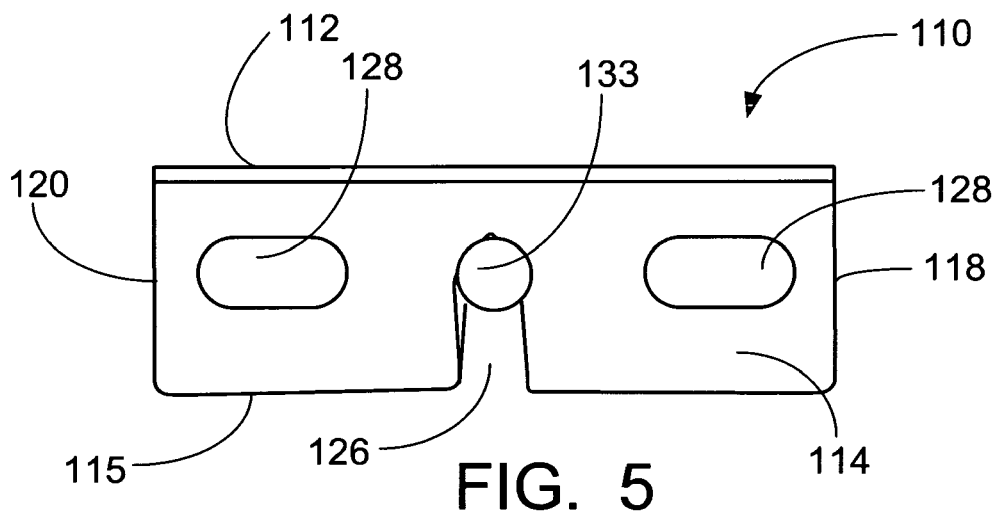
FIG. 5 is a top view of the coupling bracket in FIG. 4.

FIGS. 4 and 5 show a second embodiment of the coupling bracket 110 with a pair of side walls 114, 116 extending from a back wall 112 to a pair of edges 115, 117 that define a passage 122. Each side wall 114, 116 has a centrally located open slot 124, 126 that extends substantially perpendicularly from the edge 115, 117 to a base 132, 134. The open slots 124, 126 are laterally offset from one another and the bases 132, 134 curve outwardly from the open slots 124, 126 in opposing directions so that the curved end of one base 132 is correspondingly located and aligned with the curved end of the other base 134. The two curved bases 132, 134 form a concentric opening through the coupling bracket 110. A line drawn through the concentric opening 133 (FIG. 5) would be substantially perpendicular to the side walls 114, 116. In addition, each of the side walls 114, 116 has a pair of mounting apertures 128, 130 for attaching the coupling bracket 110 to a channel 50 (FIG. 13). These mounting apertures 128, 130 are corresponding located and aligned. The passage 122 extends between the opposing ends 118, 120 and is bounded by the back wall 112 and the side walls 114, 116.

Figure 6:
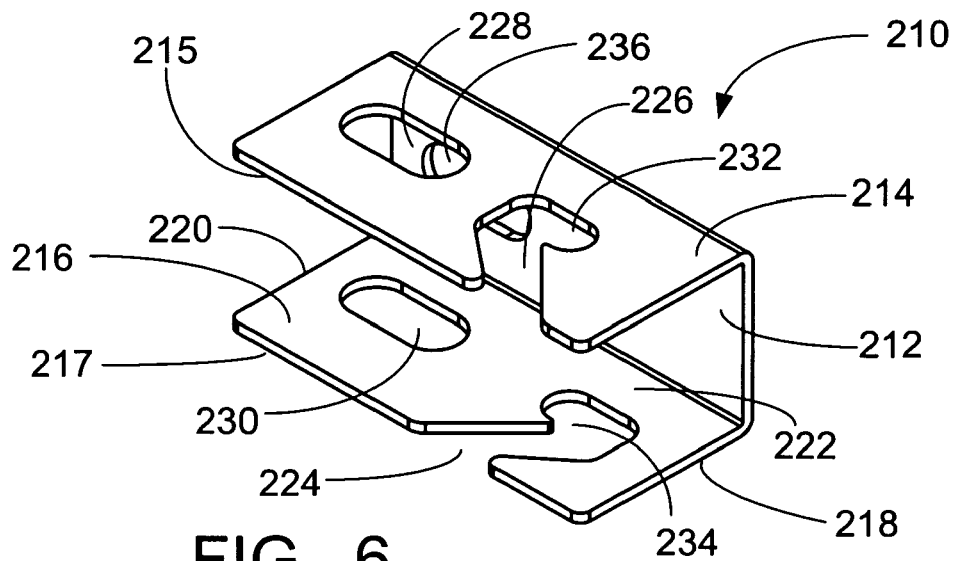
FIG. 6 is a perspective view of the front of a third embodiment of the coupling bracket.

FIG. 6 is a third embodiment of the coupling bracket 210 with a pair of side walls 214, 216 extending from a back wall 212 to a pair of edges 215, 217 that define a passage 222. Each side wall 214, 216 has an open slot 224, 226 extending angularly from the edge 215, 217 towards the back wall 212. In this embodiment, the open slots 224, 226 are located closer to one end 218 than the other end 220. Each of the open slots 224, 226 is in communication with an oblong aperture 232, 234. The oblong apertures 232, 234 are laterally offset from one another so that the first end of one aperture 232 is correspondingly located and aligned with the second end of the other aperture 234. This provides a concentric opening through the side walls 214, 216. A line drawn through the aligned opposing ends of the oblong apertures 232, 234 would be substantially perpendicular to the side walls 214, 216. The open slots 224, 226 in the side walls 214, 216 extend to the non-aligned end of the oblong apertures 232, 234. In addition, each of the side walls 214, 216 has a mounting aperture 228, 230. These apertures are used to attach the coupling bracket 210 to a channel 50 (FIG. 13) and are corresponding located and aligned. The passage 222 extends between the opposing ends 218, 220 and is bounded by the back wall 212 and the side walls 214, 216. The back wall 212 can also have an aperture 236.

Figure 7:
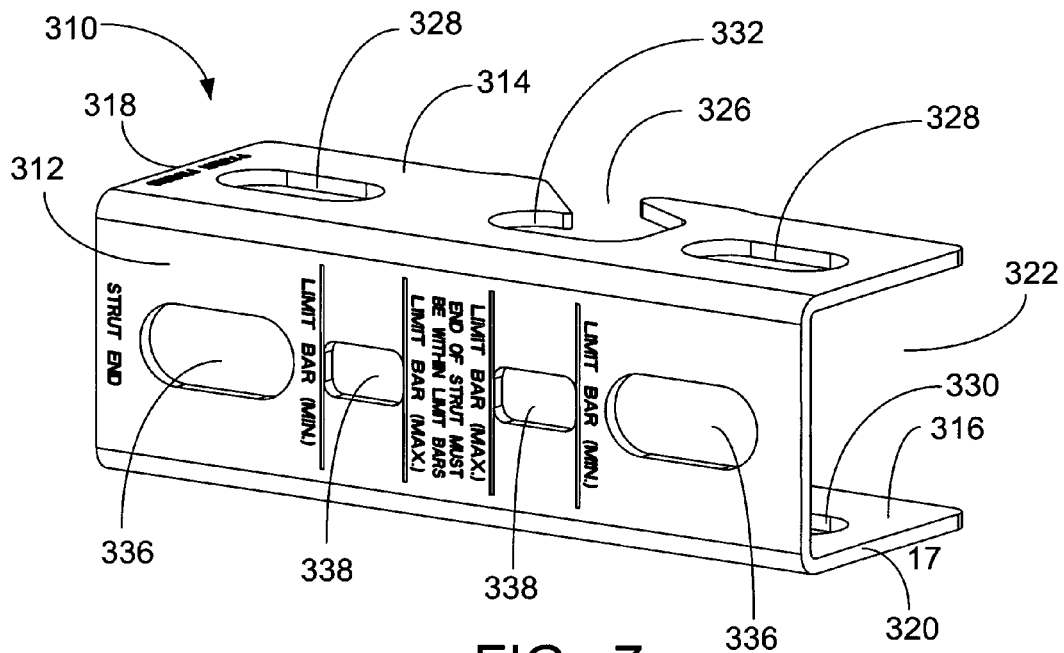
FIG. 7 shows the first embodiment of the coupling bracket with apertures in the back wall.

FIG. 7 shows an embodiment of the coupling bracket 310 that is similar to the first embodiment shown in FIGS. 1-3. The coupling bracket 310 has a pair of side walls 314, 316 extending from a back wall 312 that define a passage 322. Each side wall 314, 316 has a centrally located open slot 324 (only one shown) that is in communication with an oblong aperture 332 (only one shown). In addition, each of the side walls 314, 316 has a pair of mounting apertures 328 (only one shown) for attaching the coupling bracket 310 to a channel 50 (FIG. 13). These mounting apertures 328 are corresponding located and aligned. The back wall 312 also has a pair of apertures 336 that can be used to attach the coupling bracket 310 to a structure. The back wall 312 also has a pair of apertures 338 that are used to ensure that elongate rails 50 (FIG. 13) inserted in the passage 322 of the coupling bracket 310 from each of the ends 318, 320 are properly positioned within limits defined by the ends of the apertures 338. If the elongate rails 50 are not inserted far enough into the coupling bracket 310, they will not be properly supported. If the elongate rails 50 are inserted too far into the coupling bracket 310, they will interfere with the threaded rod 40 (FIG. 13) that extends through and substantially perpendicular to the oblong apertures 332 (only one shown) in the coupling bracket 310.

Figure 8:
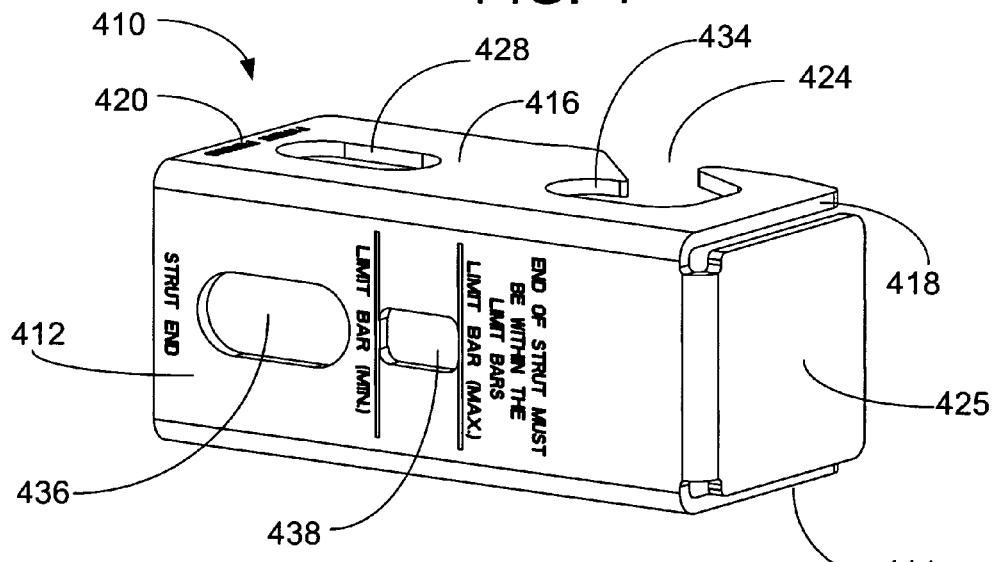
FIG. 8 shows an embodiment of an end cap of the present invention with apertures in the back wall.

FIG. 8 shows an embodiment of the coupling bracket 410 that is similar to the third embodiment shown in FIG. 6. The coupling bracket 410 has a pair of side walls 414, 416 extending from a back wall 412 and each side wall 414, 416 has an open slot 424 (only one shown). In addition, each of the side walls 414, 416 has an aperture 428 (only one is shown) for attaching the coupling bracket 410 to a channel 50 (FIG. 13). These apertures 428 are corresponding located and aligned. In this embodiment, the coupling bracket 410 is used as an end cap and the open slots 424 are located closer to one end 418 than the other end 420. In addition, one of the ends 418 has a member 425 extending from the back wall 412 between the two side walls 414, 416, which prevents an elongate rail from being inserted into the coupling bracket 410 from that end 418. The back wall 412 also has an aperture 436 that can be used to attach the coupling bracket 410 to a structure and another aperture 438 that is used to ensure that an elongate rail 50 (FIG. 13) inserted in the open end 420 of the coupling bracket 410 is properly positioned within limits defined by the ends of the aperture 438.

Figures 9, 10:
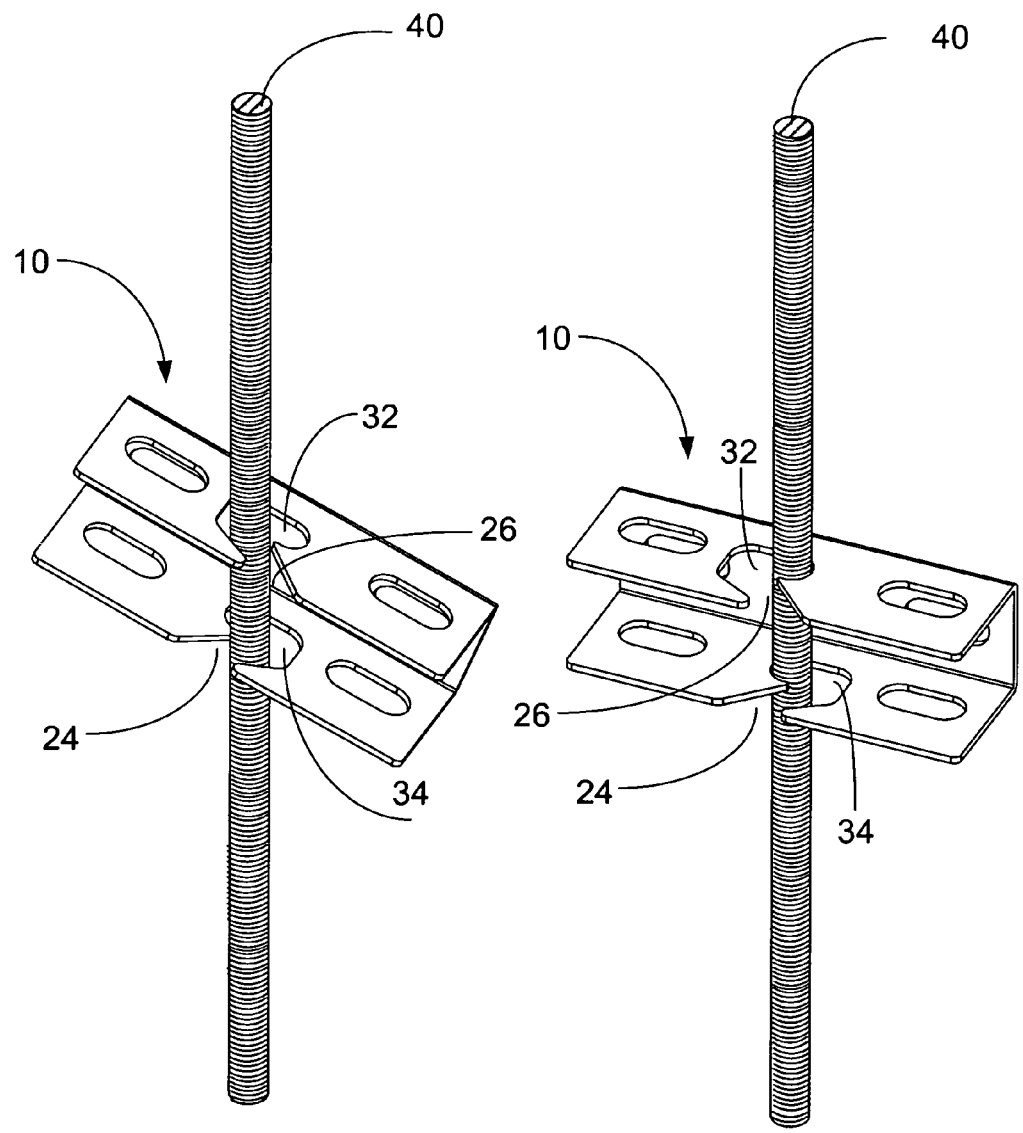
FIG. 9 shows the first embodiment of the coupling bracket as it is being attached to a threaded rod.
FIG. 10 shows the first embodiment of the coupling bracket after it is attached to a threaded rod.

FIGS. 9 and 10 show the first embodiment of the coupling bracket 10 being attached to a threaded rod 40. In FIG. 9, the coupling bracket 10 is tilted at an angle to inert the rod 40 into the open slots 24, 26. This is necessary because the open slots 24, 26 connect at opposing angles into opposite ends of the oblong apertures 32, 34 of the coupling bracket 10. As shown in FIG. 10, once the threaded rod 40 is installed in the oblong apertures 32, 34, the coupling bracket 10 is rotated into a position where it is substantially perpendicular to the threaded rod 40.

Figures 11, 12:
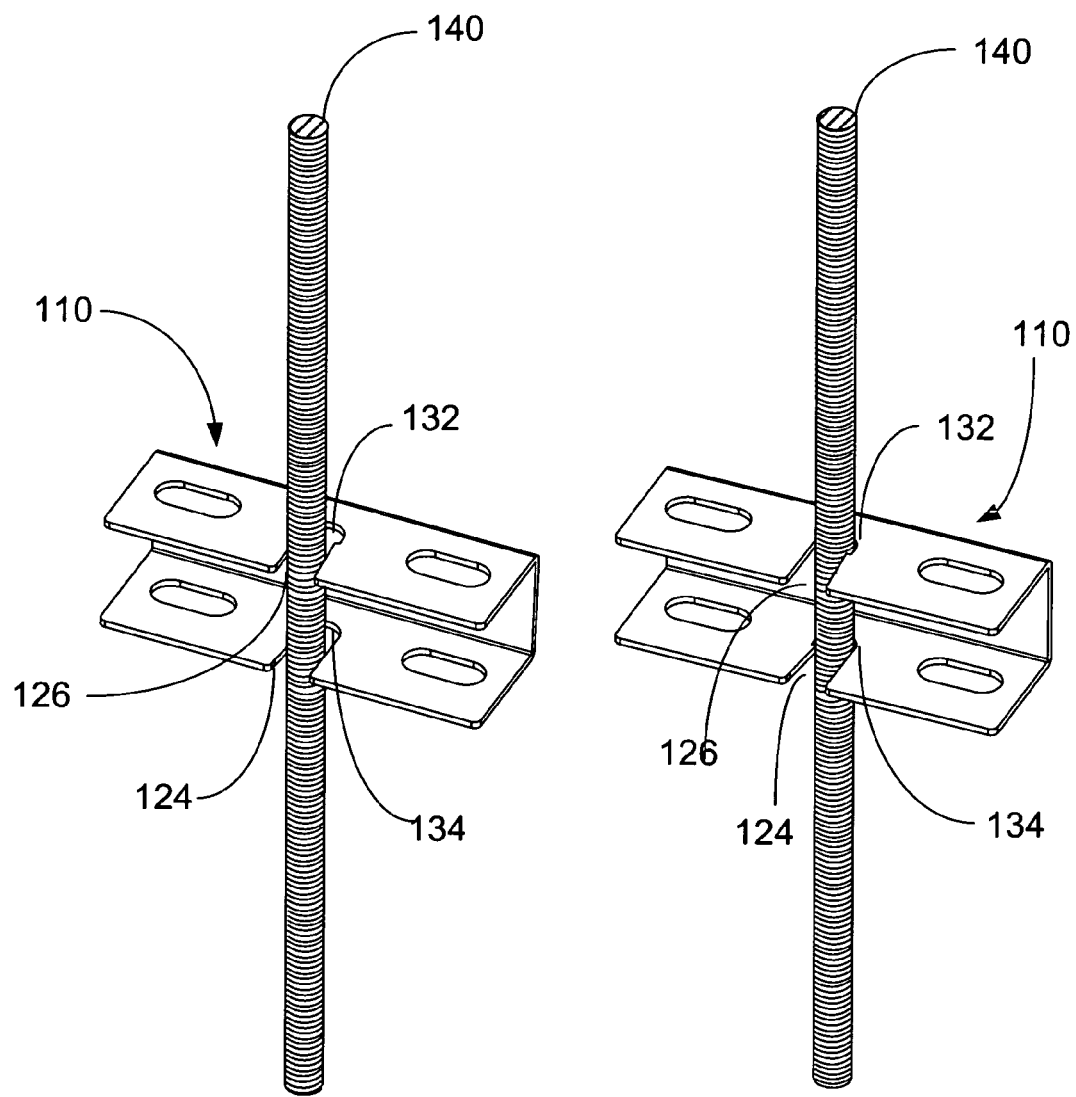
FIG. 11 shows the second embodiment of the coupling bracket as it is being attached to a threaded rod.
FIG. 12 shows the second embodiment of the coupling bracket after it is attached to a threaded rod.

FIGS. 11 and 12 show the second embodiment of the coupling bracket 110 being attached to a threaded rod 40. In FIG. 11, the coupling bracket 110 is slightly tilted in relation to the threaded rod 140 so that the offset open slots 224, 226 can receive the rod 140. After the rod 140 is positioned at the bases 132, 134 of the open slots 124, 126, as shown in FIG. 12, the coupling bracket 410 is rotated into a position where it is substantially perpendicular to the threaded rod 40.

FIG. 13 shows an exploded view of two of the coupling brackets 10, 210 being attached to two elongate rails 50. One of the coupling brackets 10 is used to connect or splice the two elongate rails 50 together and the other coupling bracket 210 is being used as an end bracket and attaches to an elongate rail 50 on only one side. The elongate rails 50 have opposing ends 52, 54, and a pair of side walls 58 that define a channel 56. A threaded rod 40 is inserted in the coupling bracket 10 that connects the two elongate rails 50 and two securement devices 60 secure the coupling bracket 10 to the threaded rod 40. The coupling bracket 10 also has a pair of apertures 28, 30 in the side walls for receiving bolts 42 that secure the coupling bracket 10 to the elongate rails 50. The second coupling bracket 210 is secured to a second threaded rod 40 with two securement devices 60 and has apertures 228, 230 for securing the coupling bracket 210 to the end 54 of the elongate rail 50.

Figure 14:
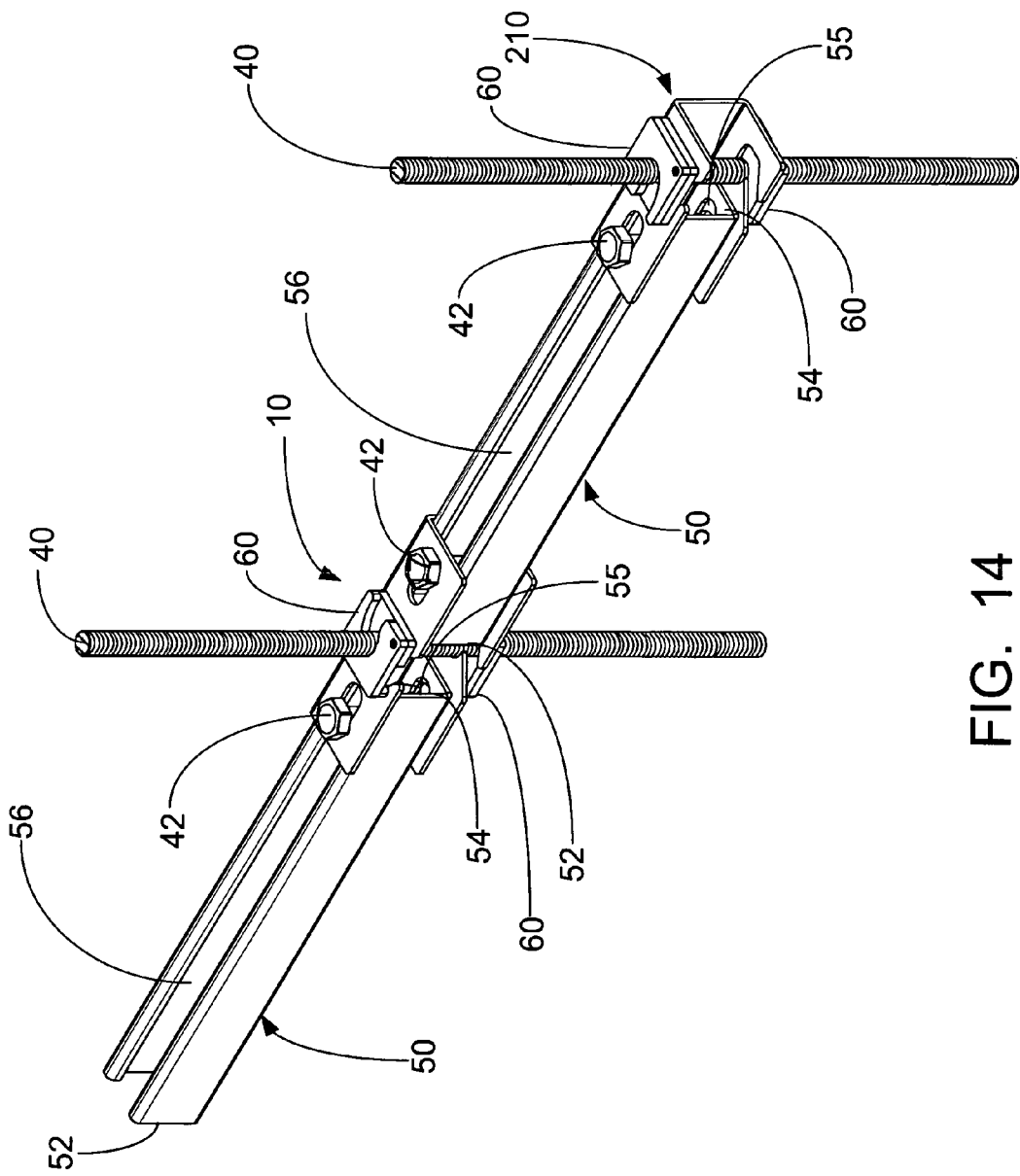
FIG. 14 shows the support structure assembly of the present invention with the first and third embodiments of the coupling bracket attached to threaded rods and channels.

FIG. 14 shows the coupling brackets 10, 210 of FIG. 13 after the coupling brackets 10, 210 are secured to the threaded rods 40 and elongate rails 50. FIG. 14 shows that apertures 55 have been formed in the elongate rails 50 so that the bolts 42 attaching the coupling brackets 10, 210 to the elongate rails 50 can extend through the elongate rails 50 and be secured on the bottom with a nut (not shown). In other embodiments, a spring nut or similar device (not shown) can be positioned in the channel 56 and used for securing the coupling brackets 10, 210 to the elongate rails 50.

Figure 15:
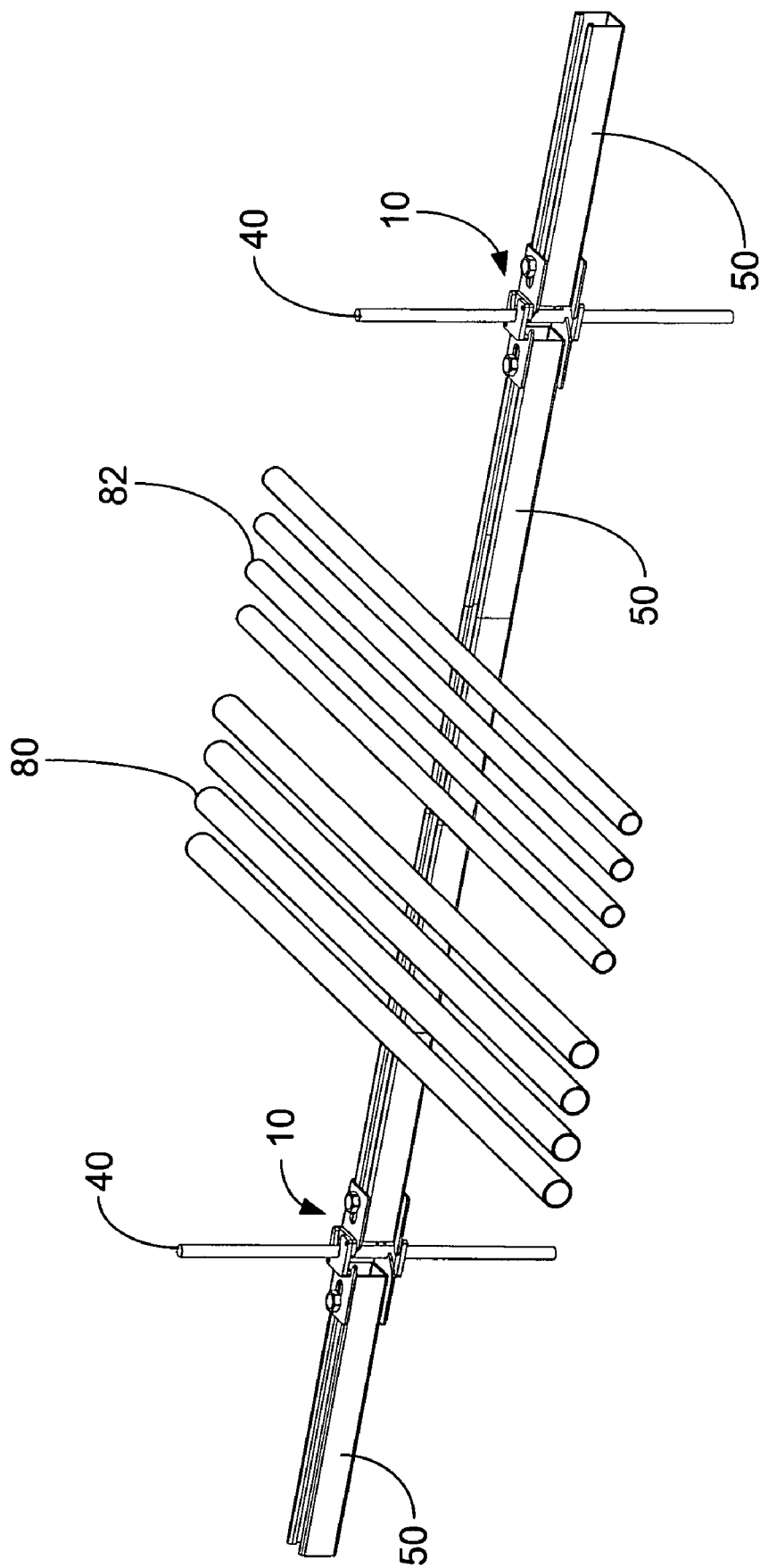
FIG. 15 shows an assembled support structure assembly of the present invention supporting electrical conduits and cables.

FIG. 15 shows two coupling brackets 10 connecting threaded rods 40 and elongate rails 50 to form a support structure assembly for supporting electrical conduits 80 and cables 82. The coupling brackets 10 can be used to connect multiple elongate rails 50 and coupling brackets 10 located at a similar elevation on the threaded rods 40 or coupling brackets 10 can be used to form multiple levels of supports at different elevations for electrical conduits 80 and cables 82.

Figure 16:
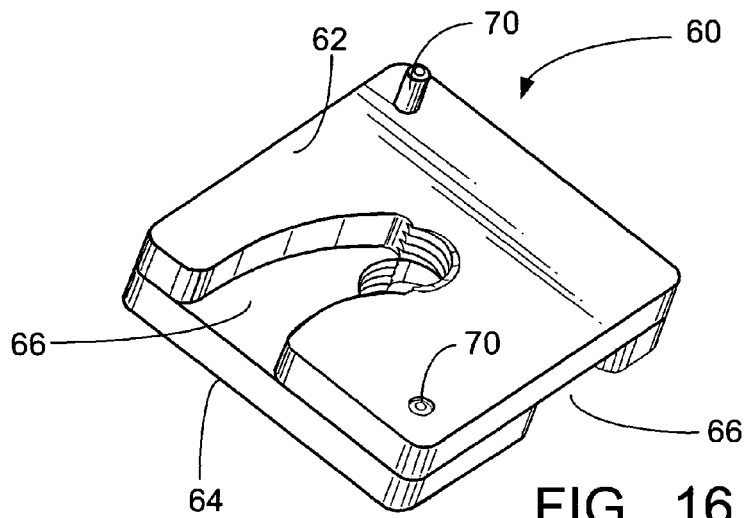
FIG. 16 shows a first embodiment of a separable nut that is used as a securement device in the closed position.
Figure 17:
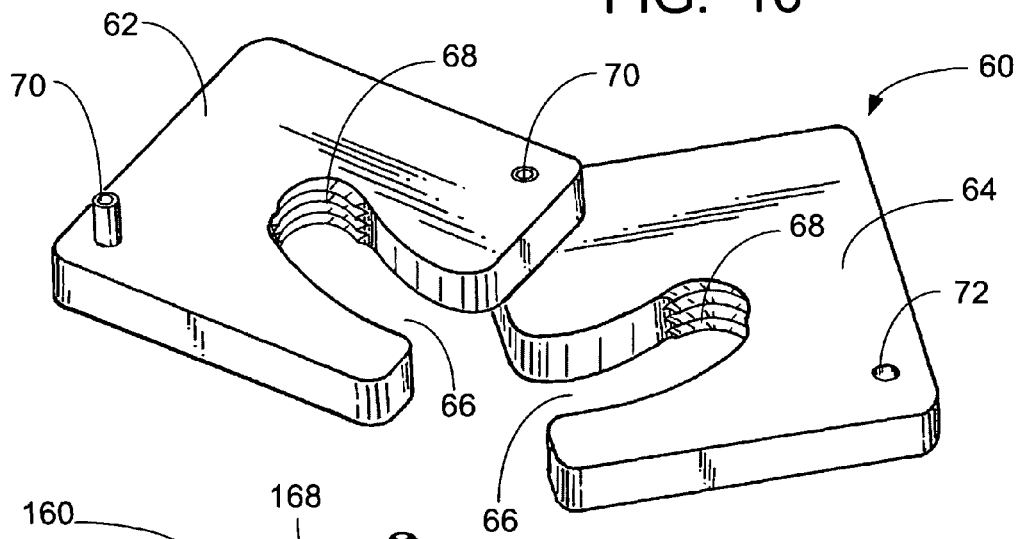
FIG. 17 shows a first embodiment of a separable nut that is used as a securement device in the open position.

FIGS. 16 and 17 show a first embodiment of a separable nut 60 that can be used to secure the coupling devices to threaded rods. FIG. 16 shows the separable nut 60 in the closed position with the two substantially rectangular, planar sections 62, 64 in a registered relationship. A pair of pins 70 inserted in apertures 72 at opposing corners of the separable nut 60 secure the two planar sections 62, 64 together. FIG. 17 shows the pin 70 at one corner of the separable nut 60 retracted so that the planar sections 62, 64 can pivotably rotate on the pin 70 in the opposing corner. Each of the planar sections 62, 64 has an arcuate open slot 66 that extends from the edge to a threaded base 68. The open separable nut 60 (FIG. 17) is placed around a threaded rod and the planar sections 62, 64 are rotated closed (FIG. 16) so that the threaded bases 68 contact the threaded rod.

Figure 18:
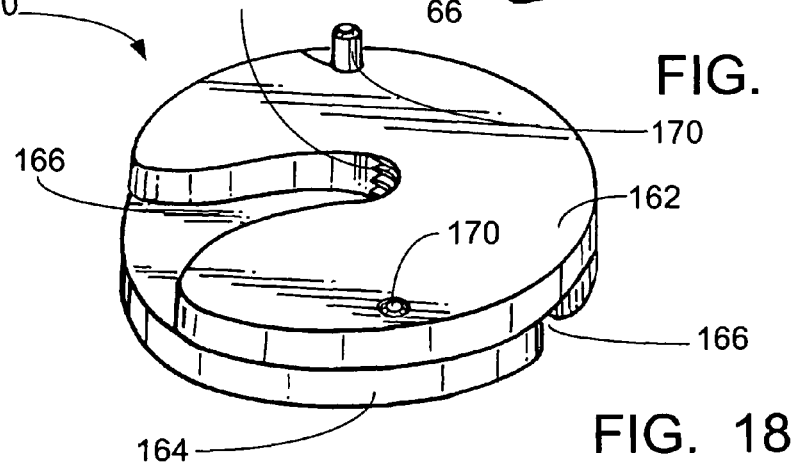
FIG. 18 shows a second embodiment of a separable nut that is used as a securement device in the closed position.

FIG. 18 shows a second embodiment of a separable nut 160 in the closed position. The separable nut 160 has two substantially round planar sections 162, 164 in a registered relationship and secured together by a pair of pins 170. Each of the planar sections 162, 164 have arcuate open slots 166 and threaded bases 168 similar to the first embodiment shown in FIGS. 16 and 17.

Figure 19:
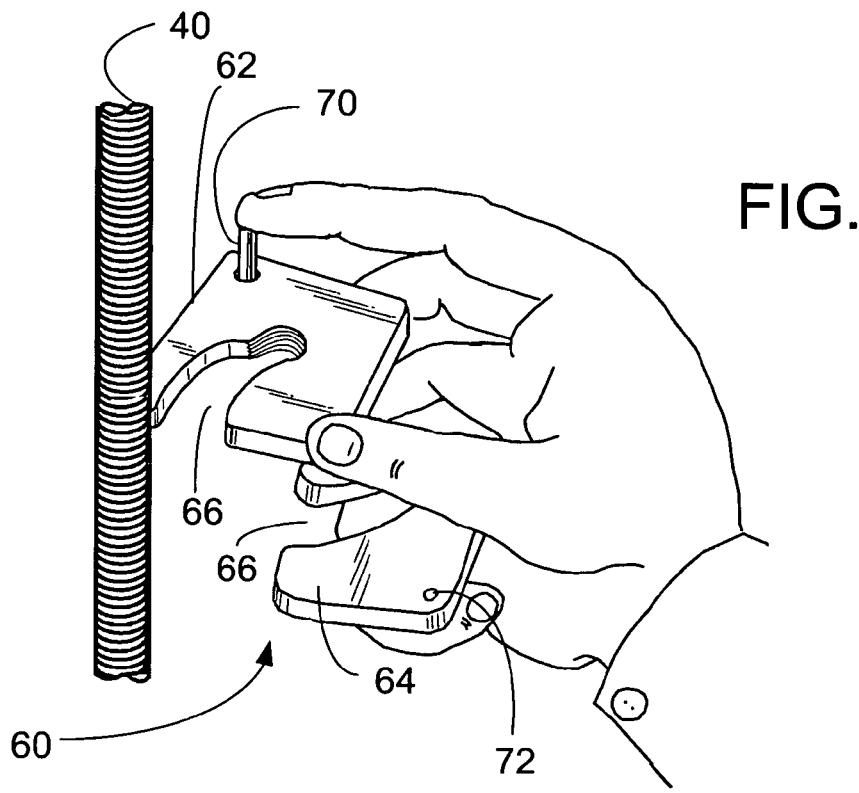
FIG. 19 shows a first embodiment of a separable nut in the open position being attached to a threaded rod.

FIG. 19 shows a separable nut 60 in the open position being attached to a threaded rod 40. The arcuate open slots 66 in the planar sections 62, 64 receive the threaded rod 40 from opposite sides and allow the planar sections 62, 64 to pivotably rotate into a closed position. Once in the closed position, the pin 70 is pushed into the aperture 72 to lock the separable nut 60 onto the threaded rod 40.

Figure 20:
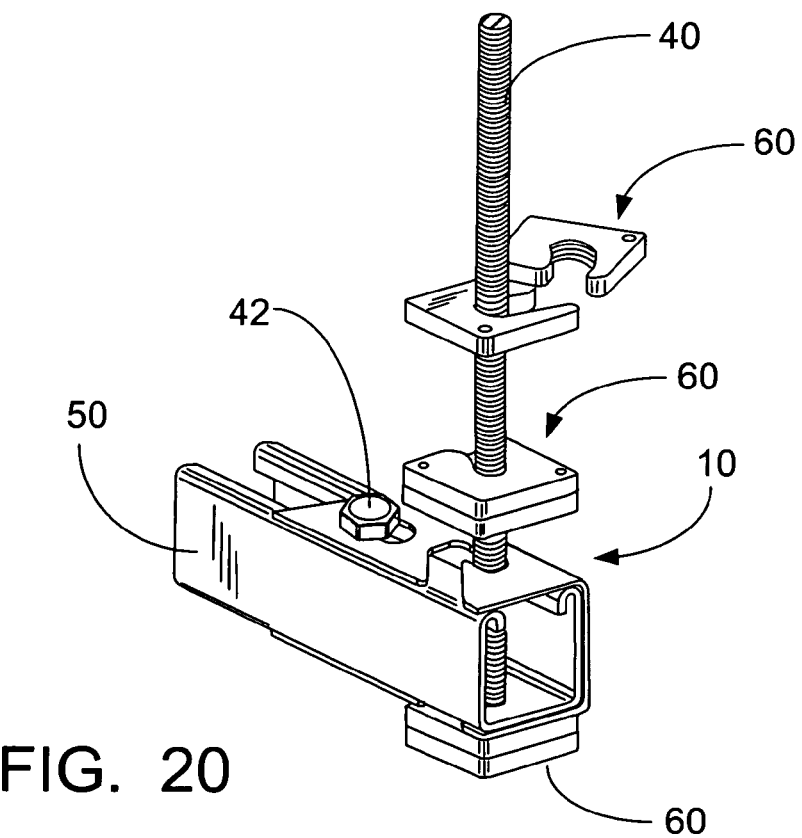
FIG. 20 shows a first embodiment of a separable nut in the closed position attached to a support structure assembly.

FIG. 20 shows two separable nuts 60 being used to secure a coupling bracket 10 to a threaded rod 40 and an elongate rail 50. One separable nut 60 is positioned below the coupling bracket 10 and one is positioned above the bracket 10. The opened separable nut 60 is merely an illustration of how the nuts might first be secured around threaded rod 40. The coupling bracket 10 is also secured to the elongate rail 50 by a bolt 42.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A coupling bracket for attaching elongate rails to rods, the coupling bracket comprising:
   a back wall;
   first and second side walls extending from the back wall to a pair of edges, wherein each of the two side walls comprises at least one mounting aperture, wherein the apertures in the two side walls are correspondingly located and aligned, wherein each side wall has an open slot extending from the edge opposite the back wall to a slot base, wherein the bases of the open slots are correspondingly located and aligned, wherein the bases are adapted to receive a rod extending though and substantially perpendicular to the side walls, wherein each of the two side walls has an oblong aperture having a first end and a second end, and wherein the first end of the oblong aperture on the first side wall and the second end of the oblong aperture on the second side wall are correspondingly located and aligned;
   an open side opposite the back wall that is defined by the pair of edges;
   a pair of opposing open ends; and
   a passage extending between the opposing open ends, wherein the passage is adapted to receive an elongate rail.

2. The coupling bracket according to claim 1, wherein the base of the open slot on the first side wall is formed by the second end of the oblong aperture and the base of the open slot on the second side wall is formed by the first end of the oblong aperture.

3. The coupling bracket according to claim 2, wherein each of the open slots in the coupling bracket has a centerline, and wherein the centerline extends inwardly from the edge of the side wall at an angle of from about 30 to about 150 degrees.

4. The coupling bracket according to claim 3, wherein the angle for the centerline of one side wall is from about 30 to about 90 degrees and the angle for the centerline of the other side wall is from about 90 to about 150 degrees.

5. The coupling bracket according to claim 1, wherein each of the open slots in the coupling bracket has a centerline, and wherein the centerline extends inwardly from the edge of the side wall at an angle of from about 30 to about 150 degrees.

6. The coupling bracket according to claim 1, wherein the back wall of the coupling bracket has at least one aperture.

7. The coupling bracket according to claim 1 further comprising an end cap located at one of the open ends of the coupling bracket, and wherein the end cap prevents an elongate rail from being inserted into the coupling bracket passage from that open end.

8. The coupling bracket according to claim 7, wherein the end cap comprises a member extending from the back wall and between the two side walls.

9. The coupling bracket according to claim 8, wherein each of the two side walls comprises at least one mounting aperture, and wherein the apertures in the two side walls are correspondingly located and aligned.

10. The coupling bracket according to claim 8, wherein each of the two side walls has an oblong aperture having a first end and a second end, and wherein the first end of the oblong aperture on the first side wall and the second end of the oblong aperture on the second side wall are correspondingly located and aligned.

11. The coupling bracket according to claim 10, wherein, on the first side wall, the base of the open slot is formed by the second end of the oblong aperture and, on the second side wall, the base of the open slot is formed by the first end of the oblong aperture.

12. The coupling bracket according to claim 11, wherein each of the open slots in the coupling bracket has a centerline, and wherein the centerline extends inwardly from the edge of the side wall at an angle of from about 30 to about 150 degrees.

13. A coupling bracket assembly for elongate channels comprising:
   an elongate rail having an open channel extending along the length thereof, wherein the rail comprises a back wall and a pair of opposed sidewalls that define the open channel;
   a threaded rod;
   a coupling bracket having a pair of opposing open ends, a back wall and two side walls extending therefrom to a pair of edges that define an open passage between the opposing open ends, wherein the passage is adapted to receive the elongate rail, wherein each of the two side walls comprises at least one mounting aperture, wherein the apertures in the two side walls are correspondingly located and aligned, wherein each side wall has an open slot extending from the edge opposite the back wall to a closed base, wherein the bases of the open slots are correspondingly located and aligned, wherein each of the two side walls has an oblong aperture having a first end and a second end, and wherein the first end of the oblong aperture on the first side wall and the second end of the oblong aperture on the second side wall are correspondingly located and aligned; and a securement device;

wherein the threaded rod is inserted into the two open slots in the coupling bracket, wherein the elongate rail is inserted into one of the opposing ends of the coupling bracket so that one of the side walls of the coupling bracket extends over the open channel, wherein the securement device engages the threaded rod to secure the coupling bracket to the threaded rod, and wherein the back wall of the coupling bracket has at least one aperture.

14. The coupling bracket assembly according to claim 13, wherein a fastening device is inserted into the mounting aperture in one of the side walls of the coupling bracket.

15. The coupling bracket assembly according to claim 13 further comprising an end cap located at one of the open ends of the coupling bracket, and wherein the end cap prevents an elongate rail from being inserted into the coupling bracket passage from that open end.

* * * * *